United States Patent
Lert, Jr. et al.

(10) Patent No.: US 11,479,410 B2
(45) Date of Patent: Oct. 25, 2022

(54) PACKING BY DESTINATION FOR AUTOMATED FULFILLED GOODS

(71) Applicant: ALERT INNOVATION INC., North Billerica, MA (US)

(72) Inventors: John G. Lert, Jr., Wakefield, MA (US); William J. Fosnight, Windham, NH (US)

(73) Assignee: Alert Innovation Inc., North Billerica, MA (US)

( * ) Notice: Subject to any disclaimer, the term of this patent is extended or adjusted under 35 U.S.C. 154(b) by 72 days.

(21) Appl. No.: 17/235,008

(22) Filed: Apr. 20, 2021

(65) Prior Publication Data
US 2021/0237975 A1    Aug. 5, 2021

Related U.S. Application Data

(63) Continuation of application No. 15/884,938, filed on Jan. 31, 2018, now Pat. No. 10,981,724.

(Continued)

(51) Int. Cl.
*B65G 1/137* (2006.01)
*G06Q 10/08* (2012.01)
(Continued)

(52) U.S. Cl.
CPC .......... *B65G 1/1373* (2013.01); *B65G 1/10* (2013.01); *B65G 1/1371* (2013.01); *G05B 15/02* (2013.01); *G06Q 10/087* (2013.01)

(58) Field of Classification Search
CPC .... B65G 1/1373; B65G 1/137; B65G 1/1371; B65G 1/10; G05B 15/02; G06Q 10/087;
(Continued)

(56) References Cited

U.S. PATENT DOCUMENTS 6,208,908 B1 * 3/2001 Boyd ................... G06Q 10/087
                                                                198/704
7,461,786 B2    12/2008 Patrick
(Continued)

FOREIGN PATENT DOCUMENTS

| | | |
|---|---|---|
| JP | 20010315967 | 11/2001 |
| JP | 2002031455 | 1/2002 |
| JP | 2012012209 | 1/2012 |

OTHER PUBLICATIONS

Response to Office Action filed Oct. 28, 2021, with English language translation of claim as amended, in Japanese Patent Application No. 2019-562239.
(Continued)

*Primary Examiner* — Glenn F Myers
(74) *Attorney, Agent, or Firm* — Vierra Magen Marcus LLP

(57) ABSTRACT

A system and method are disclosed relating to an automated store or system including an automated fulfillment section having a storage structure for storing fungible and/or non-fungible goods. The fungible and/or non-fungible goods may be retrieved from storage in response to a customer order. The system and method of the present technology allows retrieved fungible and/or non-fungible goods to be sorted and packed in accordance with stored customer preferences.

30 Claims, 7 Drawing Sheets

Related U.S. Application Data

(60) Provisional application No. 62/452,830, filed on Jan. 31, 2017.

(51) Int. Cl.
  *G05B 15/02*  (2006.01)
  *B65G 1/10*  (2006.01)

(58) Field of Classification Search
  CPC ............... G06Q 10/08; G06Q 10/0832; G06Q 30/0621; G06Q 50/30
  USPC .......................................................... 414/467
  See application file for complete search history.

(56) References Cited

U.S. PATENT DOCUMENTS

| | | | |
|---|---|---|---|
| 8,326,679 | B1 | 12/2012 | Rowe |
| 9,037,286 | B2 | 5/2015 | Lert |
| 9,230,233 | B1* | 1/2016 | Sundaresan ............ G06Q 50/30 |
| 2006/0206235 | A1 | 9/2006 | Shakes |
| 2007/0045413 | A1 | 3/2007 | Patrick |
| 2009/0081008 | A1 | 3/2009 | Somin et al. |
| 2011/0295413 | A1 | 12/2011 | Hara |
| 2011/0320034 | A1 | 12/2011 | Dearlove et al. |
| 2015/0057793 | A1 | 2/2015 | Kawano |
| 2016/0026774 | A1 | 1/2016 | Joplin |
| 2016/0140488 | A1 | 5/2016 | Lindbo |
| 2017/0036798 | A1 | 2/2017 | Prahlad |
| 2018/0024554 | A1 | 1/2018 | Brady |
| 2022/0048658 | A1* | 2/2022 | Langen .................. G06Q 50/28 |

OTHER PUBLICATIONS

Office Action dated Apr. 28, 2021 in Japanese Patent Application No. 2019-562239.
English language Abstract for JP20010315967 published Nov. 13, 2001.
English language Abstract for JP2002031455 published Jan. 31, 2002.
English language Abstract for JP2012012209 published Jan. 19, 2012.
Response to Office Action filed Sep. 13, 2021 in European Patent Application No. 18705290.7.
Response to Office Action filed Mar. 19, 2020 in European Patent Application No. 18705290.7.
International Search Report and Written Opinion dated Apr. 5, 2018 in International Patent Application No. PCT/US2018/016279.
Huang et al., "A Zoomable Shopping Browser Using a Graphic-Treemap", 2009 Sixth International Conference on Computer Graphics, Imaging and Visualization.
Non-Final Rejection dated Aug. 8, 2019 in U.S. Appl. No. 15/884,938.
Amendment dated Nov. 8, 2019 in U.S. Appl. No. 15/884,938.
Final Rejection dated Jan. 31, 2020 in U.S. Appl. No. 15/884,938.
Amendment dated Apr. 30, 2020 in U.S. Appl. No. 15/884,938.
Non-Final Rejection dated May 28, 2020 in U.S. Appl. No. 15/884,938.
Amendment dated Oct. 28, 2020 in U.S. Appl. No. 15/884,938.
Notice of Allowance and Fees Due dated Dec. 30, 2020 in U.S. Appl. No. 15/884,938.

* cited by examiner

PACKING BY DESTINATION FOR AUTOMATED FULFILLED GOODS

PRIORITY CLAIM

The present application is a continuation of U.S. patent application Ser. No. 15/884,938, filed on Jan. 31, 2018, to be issued as U.S. Pat. No. 10,981,724, entitled "PACKING BY DESTINATION FOR AUTOMATED FULFILLED GOODS," which application claims priority to U.S. Provisional Patent Application No. 62/452,830, filed on Jan. 31, 2017, entitled "PACKING BY DESTINATION FOR AUTOMATED FULFILLED GOODS," which applications are incorporated by reference herein in their entirety.

BACKGROUND

Generally, human operated and automated inventory management systems include a plurality of vertical and/or horizontal storage racks for holding and transporting inventory. Typically, inventory is stored in boxes stacked on pallets and placed into racks. The inventory can be removed from the storage racks through a combination of human operated transportation devices, such as forklifts, and automated mobile robots configured for moving inventory in and out of the storage racks. The inventory managed by automated systems typically includes fungible goods which are interchangeable, and non-fungible goods which may be selected by a customer according to customer preferences. Orders for fungible and non-fungible goods may be fulfilled by an automated inventory management system. However, there is a need for an automated inventory management system to pack the ordered fungible and/or non-fungible goods in accordance with customer preferences.

DETAILED DESCRIPTION

Figure 1:
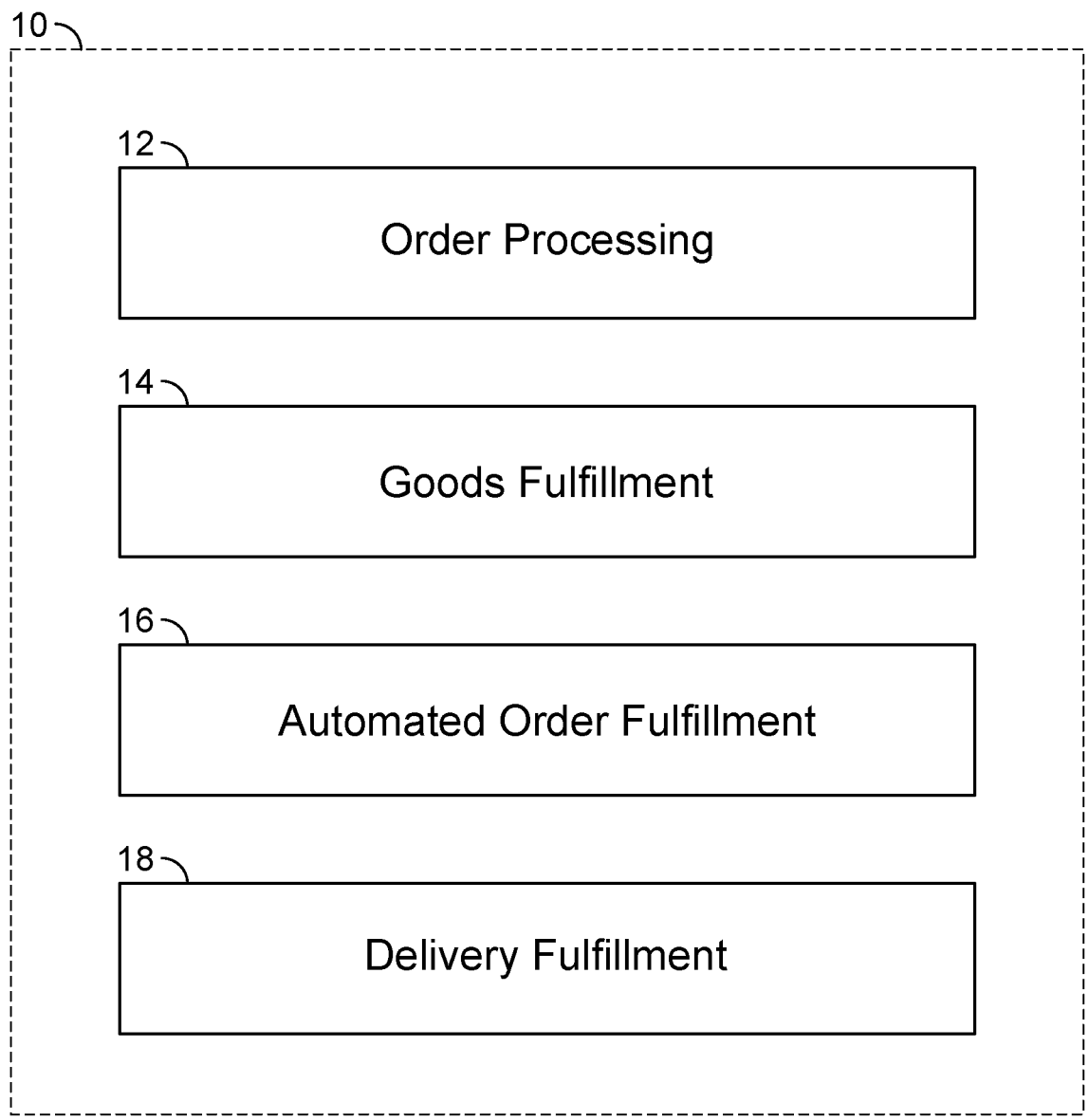
FIG. 1 is an illustrative model for implementing the steps in accordance with the aspects of the embodiment.

Referring now to FIG. 1, there is shown an illustrative model 10 for implementing the steps in accordance with the aspects of the embodiment. Although the present embodiment will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 depicts an illustrative embodiment of the automated service model 10. In particular, FIG. 1 depicts the main components that make up the automated service model 10 of the present embodiment. The main components of the automated service model 10 include, but are not limited to, order processing 12, goods fulfillment 14, automated order fulfillment 16, and delivery fulfillment 18. In accordance with an example embodiment, order processing 12 includes receiving an order from a customer (in person or online) and providing the appropriate system (e.g., goods such as fungible, non-fungible or other goods, automated goods, etc.) or combination of systems to fulfill the order. While orders for fungible and non-fungible goods may be placed online or in store via an application, alternately goods may be picked by the customers themselves in whole or in part in the store so that customers can self-select individual item units which are not identical. An example automated service model 10 is disclosed in U.S. Provisional Patent Application No. 62/423,614 Filed on Nov. 17, 2016 which is hereby incorporated by reference in its entirety.

In accordance with an example embodiment, goods fulfillment 14 may include the process, system, and method for shopping for goods with specific goods being selected by customers within a store. The goods may be made available to the customers on line or for visual inspection, physical inspection, and selection of inherently identical or the inherently non-identical goods, as disclosed in related U.S. Provisional Application No. 62/452,801 filed on Jan. 31, 2017, which is incorporated herein by reference.

The automated order fulfillment 16 may include the process, system, and method for providing automated order fulfillment of goods to customers at a store. The automated order fulfillment 16 process, system, and method is carried out within an automated fulfillment section of the store that houses inventory suitable for automated picking (e.g., storage totes of non fungible or fungible goods) using an automated inventory management system for picking the goods. In accordance with an example embodiment of the present embodiment, the automated inventory management system is a system including automated mobile robots (e.g., ALPHABOT™ robots made by Alert Corporation) configured to provide the automated order fulfillment 16 from the inventory stored in the automated fulfillment section of the store. The automated fulfillment section may include all of the resources for providing automated fulfillment. Additionally, the automated fulfillment section of the store may include storage racks for storing inventory and providing guiderails for robots retrieving the inventory stored on the storage racks, transportation to pickers at picking workstations, and returning the totes to inventory once the pickers have removed the appropriate goods from the totes. For example, the automated fulfillment section may include storage racks holding totes of goods and robots configured to provide the automated order fulfillment. Examples of such configurations are disclosed in U.S. Pat. No. 9,139,363, U.S. Patent Application Publication No. 2014/0288696 and U.S. patent application Ser. No. 15/171,802, all of which are incorporated by reference herein.

In accordance with an example embodiment, delivery fulfillment 18 includes the process, system, and method for providing all ordered and picked goods to the customers. The delivery of the goods by the process, system, and method of delivery fulfillment 18 can include delivery of any combination of automated fulfilled orders of fungible goods and automated or customer picked non-fungible goods orders as well as in person orders and online orders. Additionally, the delivery fulfillment 18 can include any level of delivery, including but not limited to in-store delivery, customer vehicle delivery, and at home delivery.

Figure 2:
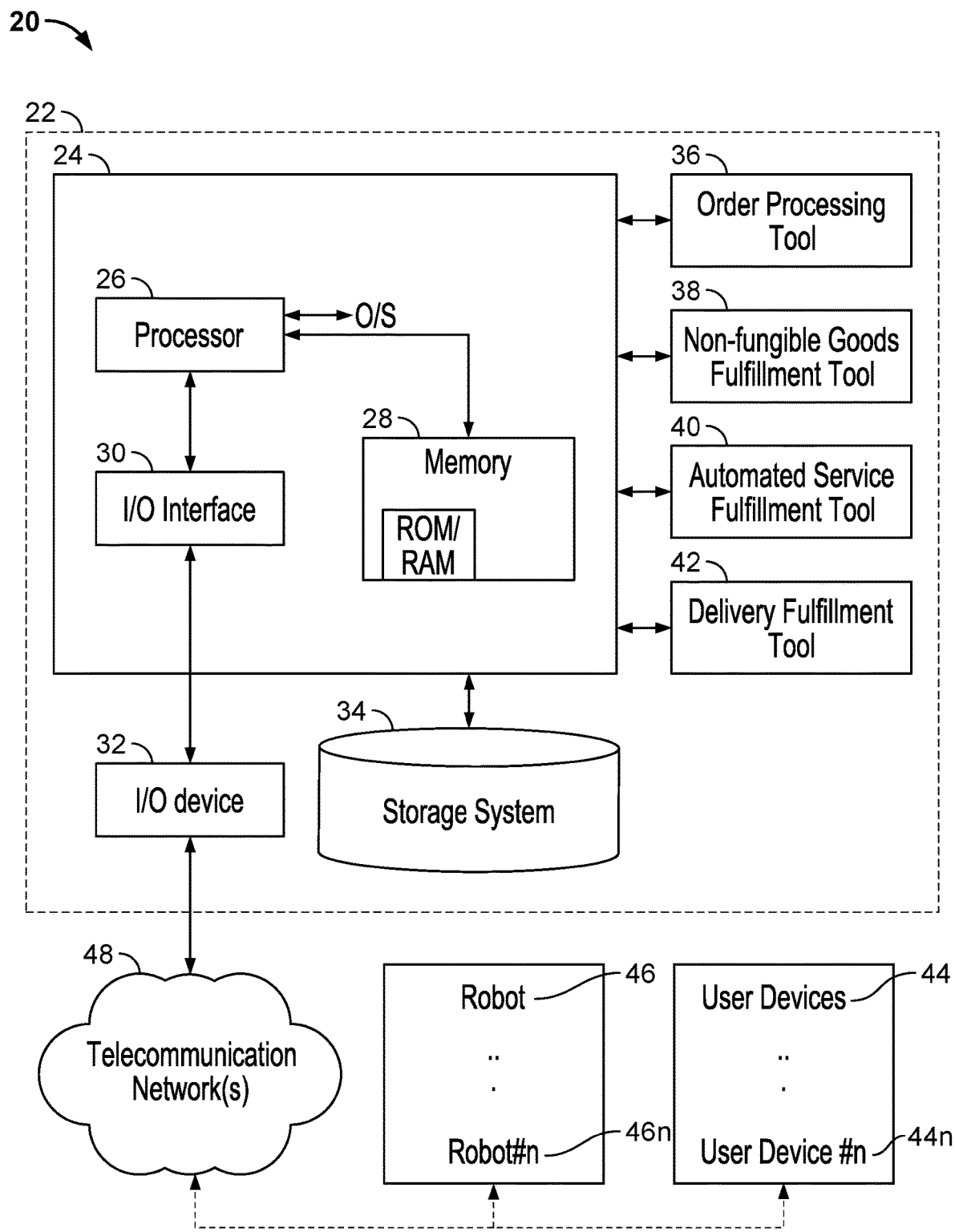
FIG. 2 is an illustrative system for implementing the steps in accordance with the aspects of the embodiment.

FIG. 2 depicts an illustrative system 20 for implementing aspects of the present embodiment. In particular, FIG. 2 depicts a system 20 including an automated service system 22. In accordance with an example embodiment, the automated service system 22 is a combination of hardware and software configured to carry out aspects of the present embodiment. In particular, the automated service system 22 can include a computing system with specialized software and databases designed for providing a method for implementing the automated service model 10. For example, the automated service system 22 can be software installed on a computing device 24, a web based application provided by a computing device 24 which is accessible by computing devices (e.g., the robots 46, the user devices 44, etc.), a cloud based application accessible by computing devices, or the like. The combination of hardware and software that make up the automated service system 22 are specifically configured to provide a technical solution to a particular problem utilizing an unconventional combination of steps/operations to carry out aspects of the present invention. In particular, the automated service system 22 is designed to execute a unique combination of steps to provide a novel approach to customer order fulfillment from a retailer.

In accordance with an example embodiment, the automated service system 22 can include a computing device 24 having a processor 26, a memory 28, an input output interface 30, input and output devices 32 and a storage system 34. Additionally, the computing device 24 can include an operating system configured to carry out operations for the applications installed thereon. As would be appreciated by one skilled in the art, the computing device 24 can include a single computing device, a collection of computing devices in a network computing system, a cloud computing infrastructure, or a combination thereof, as would be appreciated by those of skill in the art. Similarly, as would be appreciated by one of skill in the art, the storage system 34 can include any combination of computing devices configured to store and organize a collection of data. For example, storage system 34 can be a local storage device on the computing device 24, a remote database facility, or a cloud computing storage environment. The storage system 34 can also include a database management system utilizing a given database model configured to interact with a user for analyzing the database data.

Continuing with FIG. 2, the automated service system 22 can include a combination of core components to carry out the various functions of the present invention. In accordance with an example embodiment of the present invention, the automated service system 22 includes an order processing tool 36, a non-fungible goods fulfillment tool 38, an automated order fulfillment tool 40, and a delivery fulfillment tool 42. As would be appreciated by one skilled in the art, the tools 36, 38, 40, 42 can include any combination of hardware and software configured to carry out the various aspects of the present invention. In particular, each of the order processing tool 36, the non-fungible goods fulfillment tool 38, the automated order fulfillment tool 40, and the delivery fulfillment tool 42 is configured to enable operation of the automated service model 10 within a store.

In accordance with an example embodiment of the present embodiment, the system 20 includes a plurality of user devices 44 and robots 46 configured to communicate with the automated service system 22 over a telecommunication network(s) 48. The automated service system 22 can act as a centralized host, for the user devices 44 and robots 46, providing the functionality of the tools 36, 38, 40, 42 sharing a secured network connection. As would be appreciated by one skilled in the art, the plurality of user devices 44 can include any combination of computing devices, as described with respect to the automated service system 22 computing device 24. For example, the computing device 24 and the plurality of user devices 44 can include any combination of servers, personal computers, laptops, tablets, smartphones, etc. In accordance with an example embodiment of the present invention, the computing devices 24, the user devices 44, and the robots 46 are configured to establish a connection and communicate over telecommunication network(s) 48 to carry out aspects of the present invention. As would be appreciated by one skilled in the art, the telecommunication network(s) 48 can include any combination of known networks. For example, the telecommunication network(s) 48 may be combination of a mobile network, WAN, LAN, or other type of network. The telecommunication network(s) 48 can be used to exchange data between the computing devices 24, the user devices 44, and the robots 46 exchange data with the storage system 34, and/or to collect data from additional sources.

In accordance with an example embodiment, the order processing tool 36 is configured to handle all the processing for order processing 12. In particular, the order processing tool 36 is configured to receive customer order information (e.g., in person or remotely) and allocate the orders accordingly (e.g., dispatch automated order fulfillment), as discussed in greater detail herein. In accordance with an example embodiment of the present invention, the non-fungible goods fulfillment tool 38 is configured to handle all the processing related to non-fungible goods fulfillment 14. In particular, the non-fungible goods fulfillment tool 38 handles all of the operations at a front end of a store including managing customer orders, payment, and other services, as discussed in greater detail herein. In accordance with an example embodiment of the present invention, the automated order fulfillment tool 40 is configured to handle all the processing related to automated order fulfillment 16. In particular, the automated order fulfillment tool 40 is configured to handle the operations at a backend of the store including automated order picking, inventory management, etc., as discussed in greater detail herein. In accordance with an example embodiment of the present invention, the delivery fulfillment tool 42 is configured to handle all the processing related to delivery fulfillment 18. In particular, the delivery fulfillment tool 42 may be configured to handle the processing related to delivering fulfilled customer orders to the customer at a particular destination, as discussed in greater detail herein.

In accordance with an example embodiment, the automated service model 10 is implemented within a brick-and-mortar retail store configured for use in accordance with the present embodiment. The store can be any retail store that provides goods available for sale to customers. In accordance with an example embodiment of the present invention, the store is a grocery store providing groceries and other goods traditionally found at grocery stores to customers. The store of the present embodiment differs from conventional stores in how customers obtain goods from the store. In particular, the store may include a shopping section enabling customers to hand pick goods, as done in traditional grocery stores, or otherwise select goods for automated fulfillment (such as by interactive display, scanning a tag, image, or code, or the like) and the automated fulfillment section with an automated each-picking system that can pick most or all of the items that customers designate within an order (either an online or in person order).

Figure 3:
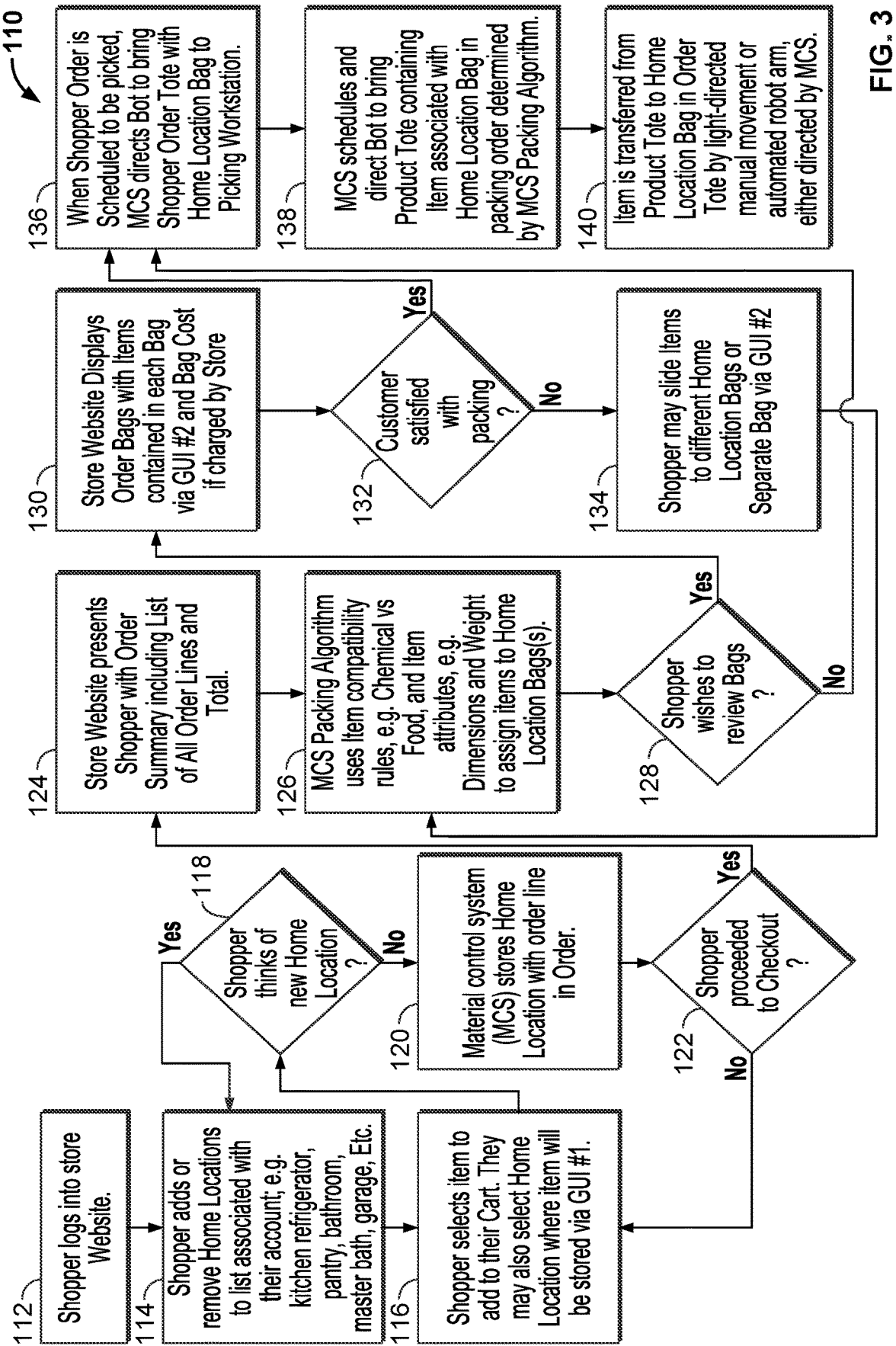
FIG. 3 is a process flow diagram.
Figure 6:
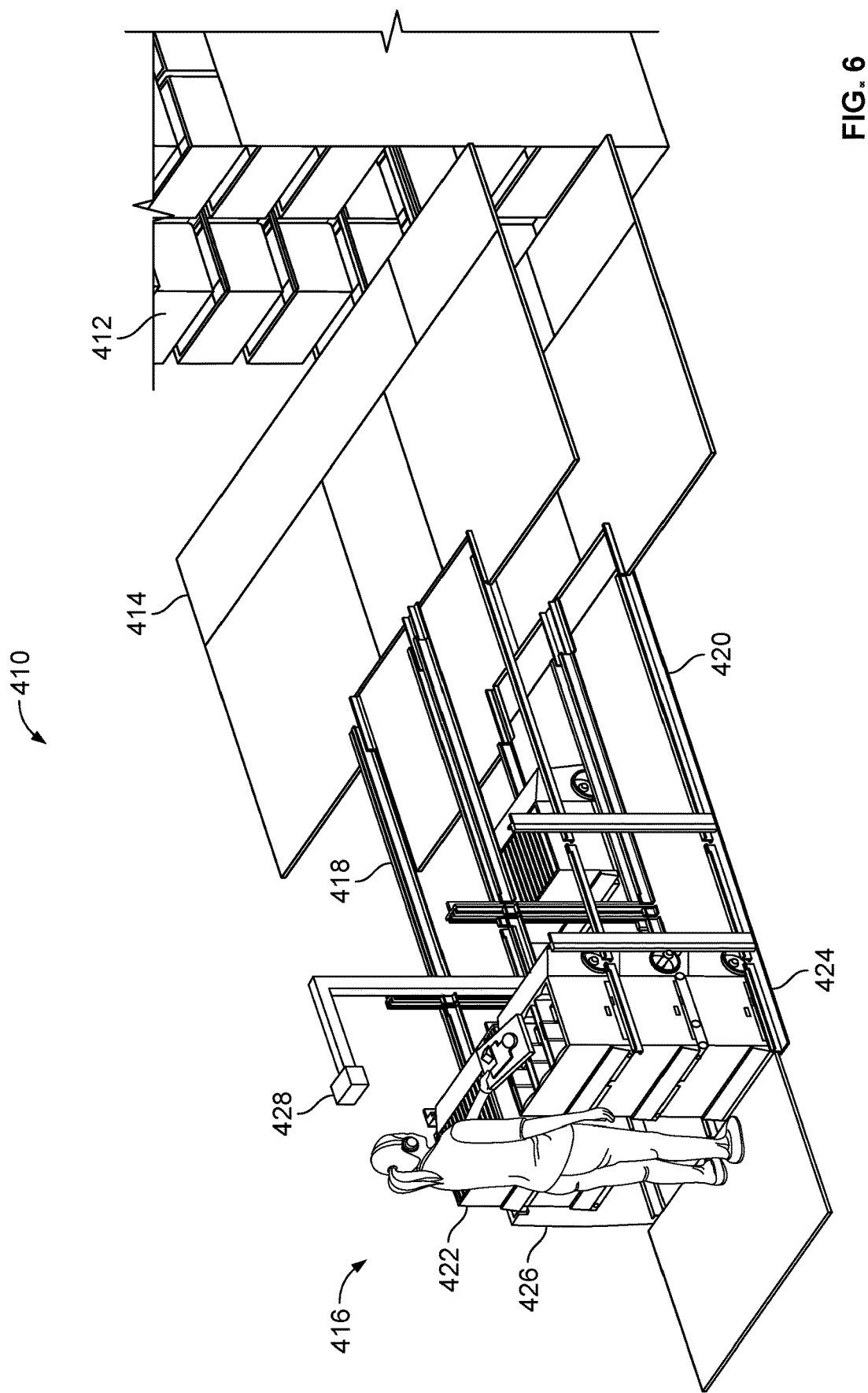
FIG. 6 is a manual station.
Figure 7:
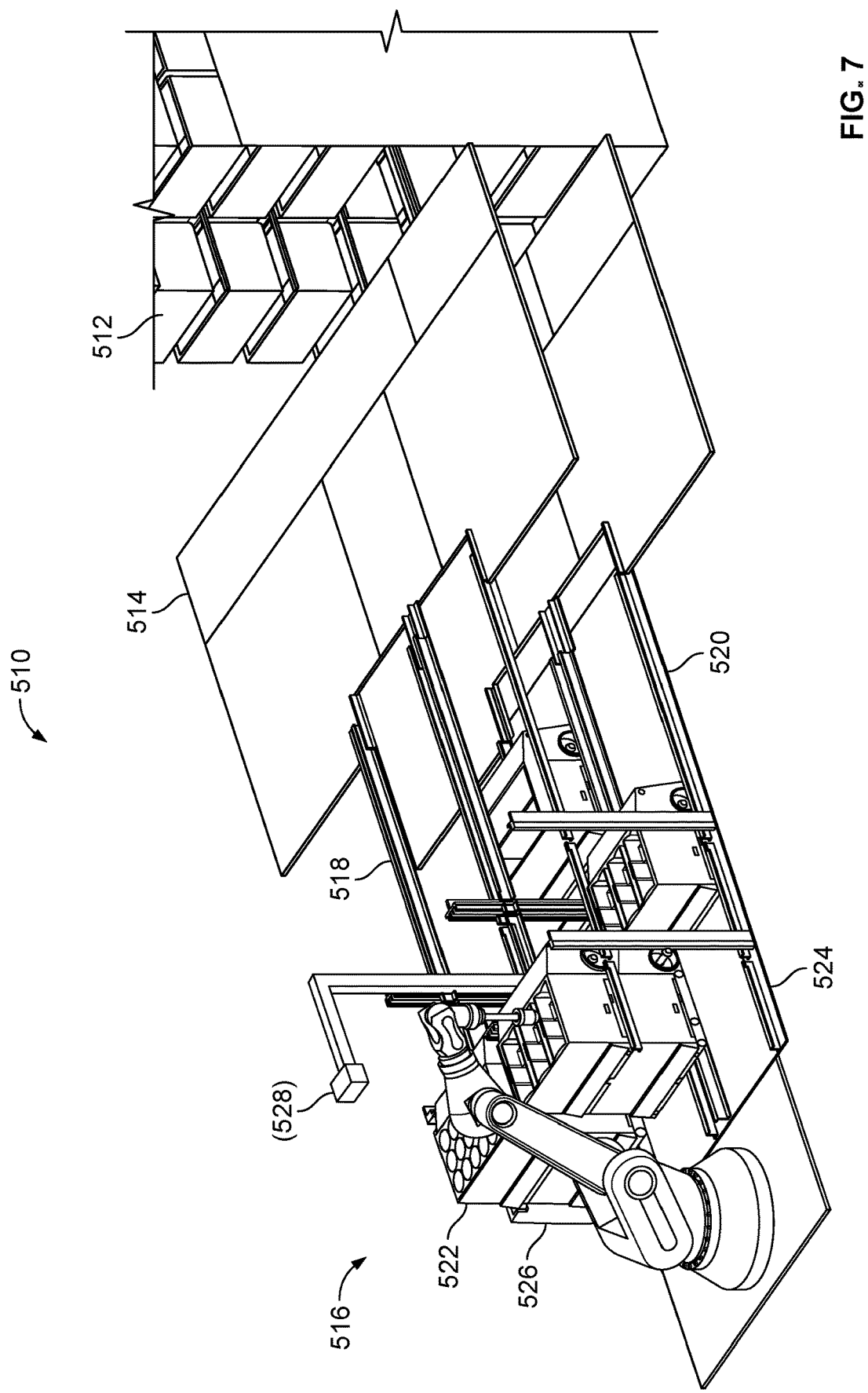
FIG. 7 is an automated robotic station.

Referring now to FIG. 3, there is shown process 110 whereby orders may be processed and fulfilled within system 10, 20 where items to be packed may be sorted and packed in accordance with a user's preferences. In 112 a shopper or user may log into the store website. In 114 the shopper may add or remove home locations to a list associated with their account. Here, home locations may be for example kitchen refrigerator, pantry, bathroom, master bath, garage, etc. or any suitable location. Home locations may further include locations that are not necessarily associated with the home, for example, office supplies or any suitable classification of material or location. In 116 the shopper selects one or more item(s) to add to their Cart. Here, they may also select a home location where item will be stored via GUI #1 210 shown in FIG. 4. In 118, the shopper thinks of new home location? If yes, then go back to 114, if no then go to 120. In 120 a Material Control System (MCS) (which can be, e.g., a subsystem, ancillary system, and/or collaboratively otherwise a portion of and/or designed to operate in conjunction with a Central Control System (CCS)) stores the home location with the order line in the order. In 122 has the shopper proceeded to Checkout? If yes then proceed to 124, if no then go back to 116. In 124 the store website presents the shopper with order summary including a list of all order lines and total. In 126 the MCS Packing Algorithm uses item compatibility rules, for example, Chemical vs Food, and Item attributes, for example, Dimensions and Weight to assign items to home location bag(s). In 128 does the shopper wish to review the bags? If yes then proceed to 130, if no then proceed to 136. In 130 the store website displays order bags with items contained in each bag via GUI #2 310 as seen in GIG. 5 and bag cost if charged by the store. In 132 is the customer satisfied with packing? If yes then proceed to 136, if no then proceed to 134. In 134 the shopper may slide items to different home location bags or separate bag via GUI #2 310 and then proceed to 126. In 136 when the shopper order is scheduled to be picked, the MCS directs bot to bring shopper order tote with home location bag(s) to a picking workstation. Example picking workstations are shown in FIGS. 6 and 7. In 138, the MCS schedules and directs one or more bot(s) to bring product totes containing items associated with the home location bag in packing order determined by the MCS packing algorithm. In 140 the item is transferred from product tote to the home location bag in the order tote by light-directed manual movement or automated robot arm, either directed by MCS.

Figure 4:
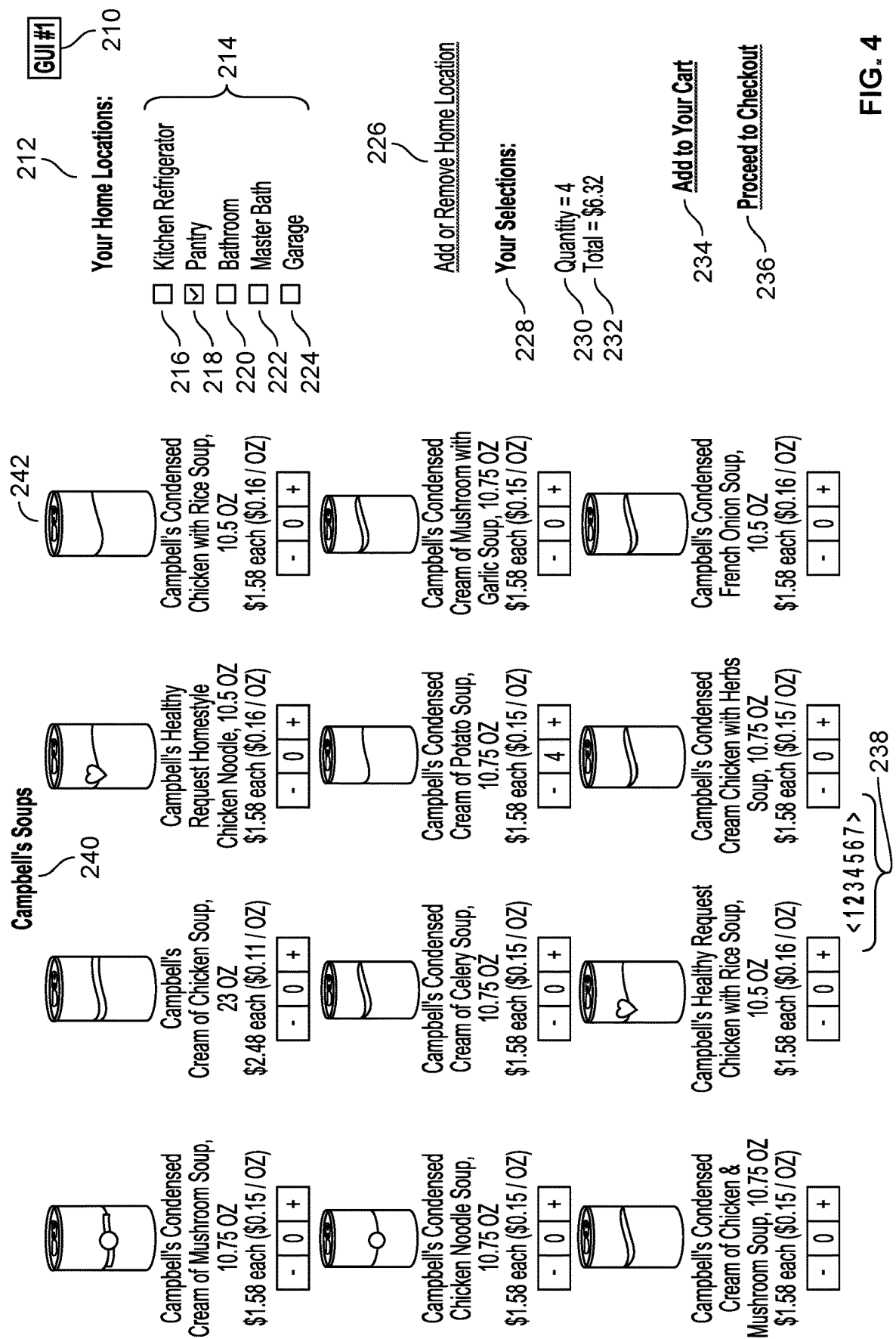
FIG. 4 is a Graphical User Interface (GUI)

Referring now to FIG. 4, there is shown a shop and selection GUI #1 210. GUI 210 has a home locations portion 212 where a user may select a home location 214 that goods are to be directed to, for example kitchen refrigerator 216, pantry 218, bathroom 220, master bath 222, garage 224 or any other suitable location. A location manager 226 is provided where the user may add or remove locations. A selection portion 228 is shown where order information such as quantity 230, total 232 or any suitable selection information may be displayed. Goods can be added to your cart 234 where selection will add the identified goods to the user's cart and direct them to the home location selected. Upon completion of the order, the user may select proceed to checkout 236. Goods may be selected by the user in a goods search and selection portion 240 where a user may scroll 238 through any suitable type of goods, for example, soups 242 selected from a search portion 240 and add or remove goods based on selection of +/− based on the good selected.

Figure 5:
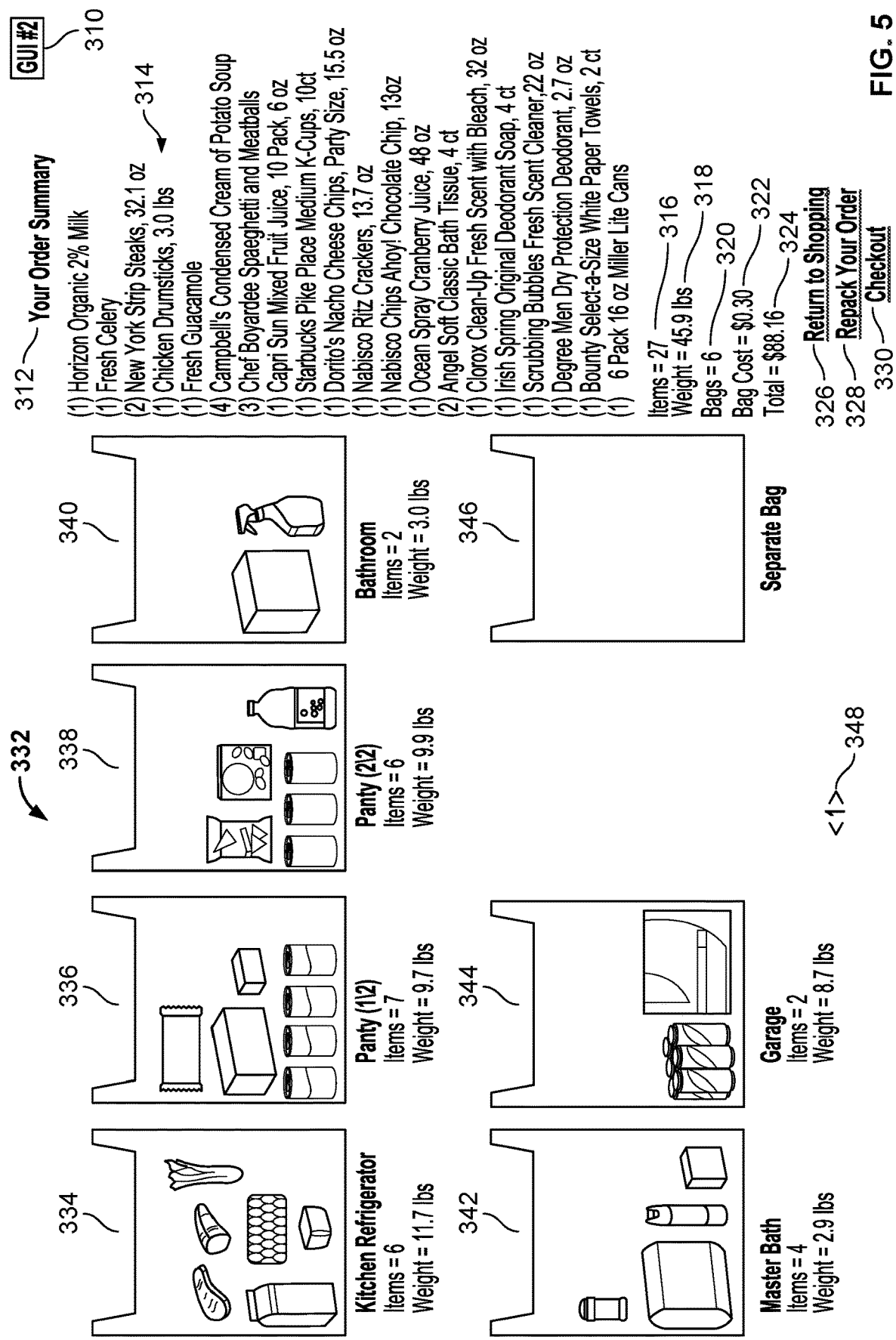
FIG. 5 is a GUI.

Referring now to FIG. 5, there is shown an order GUI #2 310. GUI 310 has an order summary portion 312 where an itemized list 314 of the order may be shown, the number of items 316, the order weight 318, the number of bags 320, the bag cost 322, the order total 324 or other suitable order summary information. The user may choose to continue shopping with the return to shopping 326 selection. The user may choose to repack the order with the repack your order 328 selection where a user may then direct contents between bags or add separate bags. Further, the user may direct the MCS to change the packing order, material location or other aspects within a given bag. And the user may choose to checkout with the checkout 330 selection. Bags or any suitable product containers are shown with contents in bagged or packed order view 332. Each bag is shown with the home location, the number of items, weight or any other suitable information pertaining to the bag, for example, if more than one bag is to be directed to a single home location. The MCS may employ algorithms to determine variables such as maximum volume or weight per bag and automatically add bags based on thresholds of the variables. The MCS may further label the bags appropriately with any suitable content or home location information during packing or otherwise and may alternately use bags based on color, label or otherwise to facilitate the user to direct the contents to the appropriate location. Example bags with their contents displayed for a given home location that goods are to be directed to, for example, may include kitchen refrigerator 334, pantry ½ 336, pantry 2/2 338, bathroom 340, master bath 342, garage 344, separate bag 346 or any other suitable bag or location. For orders that cannot be displayed on a single screen, a scroll function selection 348 may be provided.

When the shopper order is scheduled to be picked, the MCS directs one or more mobile robot(s) (also referred to herein as bot(s)) to bring a shopper order tote with home location bag(s) to a picking workstation. Example picking workstations are shown in FIGS. 6 and 7. Here, the MCS schedules and directs one or more bot(s) to bring product tote containing item associated with the home location bag in packing order determined by the MCS packing algorithm. Here, the item is transferred from product tote to the home location bag in the order tote by light-directed manual movement or automated robot arm, either directed by MCS. In FIG. 6 manual light directed picking and packing 410 is shown. Here, products may be retrieved from product section 412 and transported by bots over decks 414 to workstation 416 via product side rails 418 and order side rails 420. Here picker 422 transfers product from product totes on product bots 426 to bags or order tote on order bots 424 where the item is transferred from product tote to the home location bag in the order tote by light-directed 428 manual movement. In FIG. 7 automated robotic directed picking and packing 510 is shown. Here, products may be retrieved from product section 512 and transported by bots over decks 514 to workstation 516 via product side rails 518 and order side rails 520. Here robot 522 transfers product from product totes on product bots 526 to bags or order tote on order bots 524 where the item is transferred from product tote to the home location bag in the order tote by automated, for example, MCS directed or may be guided by light directed or vision system 528 robotic movement.

In accordance with on aspect, an automated store comprises a building structure partitioned into an automated fulfillment section and a shopping section. The automated fulfillment section comprises a storage section with a storage structure storing a plurality of totes, including totes containing eaches of goods and designated as product totes; an automated fulfillment system managing handling of the plurality of totes, and which tracks in real-time quantities and locations of eaches of goods in each of the plurality of totes; a picking workstation where eaches of goods are placed into totes and eaches of goods are removed from totes; and at least one mobile robot comprising a propulsion subsystem, wherein the at least one mobile robot propels itself horizontally and vertically throughout the storage structure, placing totes into the storage structure, removing totes from the storage structure, and transporting totes throughout the automated fulfillment section, as required; and a central control system that manages automated processes in the automated store; wherein when the central control system receives input designating a customer-preferred order of unpacking of eaches of goods from a delivery bundle, the central control system and the automated fulfillment system determine a preferred packing order of eaches of goods into one or more order tote and instruct the at least one mobile robot to retrieve product totes from the storage structure and deliver product totes in a tote-specific order to the picking workstation as determined by the central control system and the automated fulfillment system based on the preferred packing order of eaches of goods into the one or more order tote, and eaches of goods are picked from the plurality of product totes and placed into the one or more order tote in the tote-specific order to result in the eaches of goods being packed in the preferred packing order of eaches of goods; and wherein a resulting packing order by which the eaches of goods are placed into the one or more order tote matches the customer-preferred order of packing of eaches of goods the delivery bundle.

In accordance with another aspect, the picking workstation comprises one or more inflow transit decks for the at least one mobile robot to deliver product totes to the picking workstation, and at least one outflow transit deck for the at least one mobile robot to exit the picking workstation.

In accordance with another aspect, the picking workstation further comprises a queuing area for queuing the at least one mobile robot in a preferred robot order of delivery determined based on the customer-preferred order of unpacking of the eaches of goods from a delivery bundle.

In accordance with another aspect, the picking workstation comprises one or more inflow transit decks for the at least one mobile robot to deliver product totes to the picking workstation, and at least one outflow transit deck for the at least one mobile robot to exit the picking workstation.

In accordance with another aspect, the eaches of goods contained in the one or more order tote are transferred to a delivery bundle at a transfer station located in the automated store.

In accordance with another aspect, the preferred packing order of eaches of goods into the one or more order tote is determined based on the customer-preferred order of unpacking the eaches of goods from the delivery bundle at a customer location for a customer placing an order for the eaches of goods.

In accordance with another aspect, the preferred packing order of eaches of goods into the one or more order tote is based on rooms at a customer location in which the eaches of goods are to be stored as they are removed from the delivery bundle.

In accordance with another aspect, a destination of the eaches of goods is labeled on the one or more order tote.

In accordance with another aspect, a destination of the eaches of goods is labeled on the delivery bundle.

In accordance with another aspect, the preferred packing order of eaches of goods in the one or more order tote is based on a storage temperature of the eaches of goods.

In accordance with another aspect, the shopping section comprises one or more shopping terminals.

In accordance with another aspect, the system further comprises a transfer station that receives and stores a delivery bundle of the one or more order tote in a designated location until a customer arrives to take possession of the delivery bundle.

In accordance with another aspect, the preferred packing order of eaches of goods into the one or more order tote further comprises at least a quantity of one or more eaches of goods.

In accordance with another aspect, the propulsion subsystem comprises at least one electric motor, transmission mechanisms, and drive mechanisms.

In accordance with another aspect, a method comprises in an automated store comprising a building structure partitioned into an automated fulfillment section and a shopping section; the automated fulfillment section comprising a storage section with a storage structure storing a plurality of totes, including totes containing eaches of goods and designated as product totes; and a picking workstation where eaches of goods are placed into totes and eaches of goods are removed from totes; and at least one mobile robot comprising a propulsion subsystem, wherein the at least one mobile robot propels itself horizontally and vertically throughout the storage structure, placing totes into the storage structure, removing totes from the storage structure, and transporting totes throughout the automated fulfillment section, as required; and a central control system that manages automated processes in the automated store and tracks number of units of eaches of goods contained in product totes in real time stored throughout the automated fulfillment section; receiving input of a customer order designating a customer-preferred order of unpacking of eaches of goods from a delivery bundle; the central control system transforming the customer-preferred order of unpacking of the eaches of goods from a delivery bundle into a tote-specific order that totes are delivered to the picking workstation; the automated fulfillment system instructing the at least one mobile robot to retrieve the one or more product totes from the storage structure and deliver the one or more product totes to the picking workstation in the tote-specific order; the central control system instructing a picker to remove a particular number of eaches of goods from the one or more product totes and place the removed eaches of goods into a particular order tote of one or more order tote in the tote-specific order that totes are delivered to the picking workstation; and wherein a resulting order by which the eaches of goods are placed into the one or more order tote complies with the customer-preferred order of unpacking of the eaches of goods from a delivery bundle in such a way that enables unpacking of the eaches from the delivery bundle in the customer-preferred order of unpacking of the eaches of goods.

In accordance with another aspect, the customer-preferred order of unpacking is based on at least one location in a customer home.

In accordance with another aspect, the at least one location is labeled on the one or more order tote and/or the delivery bundle.

In accordance with another aspect, the customer-preferred order of unpacking is based on a storage temperature of the eaches of goods.

In accordance with another aspect, the shopping section comprises one or more shopping terminals and a transfer station, and wherein the transfer station receives and stores the delivery bundle in a designated location until a customer arrives to take possession of the delivery bundle.

In accordance with another aspect, the input further comprises at least a quantity of one or more eaches of goods.

In accordance with another aspect, the picking workstation comprises one or more inflow transit decks for the at least one mobile robot to deliver product totes to the picking workstation, and at least one outflow transit deck for the at least one mobile robot to exit the picking workstation.

In accordance with another aspect, the picking workstation further comprises a queuing area (425, 525) for queuing the at least one mobile robot in a preferred robot order of delivery determined based on the customer-preferred order of unpacking of the eaches of goods from a delivery bundle.

In accordance with another aspect, the picking workstation comprises one or more inflow transit decks for the at least one mobile robot to delivery product totes to the picking workstation, and at least one outflow transit deck for the at least one mobile robot to exit the picking workstation.

In accordance with another aspect, the method further comprises a transfer station that receives and stores a delivery bundle of the one or more order tote in a designated location until a customer arrives to take possession of the delivery bundle.

In accordance with another aspect, the propulsion subsystem comprises at least one electric motor, transmission mechanisms, and drive mechanisms.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Further, the terms "robot" and "bot" are utilized interchangeably herein in accordance with their conventional meanings, specifically a useful machine or device, namely, a programmable, multifunctional device capable of moving material, parts, tools, or specialized devices through various programmed motions for the performance of a variety of tasks, allocations, designations, or the like; and/or the machine or device being capable of carrying out a simple or complex series of actions; and/or the machine or device being capable of performing tasks that may or may not otherwise be work of a person; and/or the machine or device being a programmable mechanical device capable of performing tasks and interacting with its environment, without the aid of human interaction; and the machine or device being capable of operating automatically or being controlled by a computer.

Unless otherwise noted or defined herein, to the extent directional vocabulary is utilized, the disclosure and figures are described with reference to a conventional three-dimensional coordinate axis system of X, Y and Z, where the X direction is generally left-right or east-west, the Y direction is generally in-out, relative to the plane of the page of the document, and the Z direction is generally up-down or north-south on the page. Further as utilized herein, the terms "horizontal" and "vertical" are utilized consistent with their conventional definitions as would be appreciated by those of skill in the art, and as generally illustrated and expanded upon below. For example, in the fields of physics, engineering, and construction, the direction designated as vertical is usually that along which a plumb-bob hangs in response to the force of gravity. The direction of horizontal is considered along a line or plane that is normal or orthogonal to the vertical plane. As such, moving in a horizontal direction (horizontally) is effectively equivalent to traveling across the earth's surface, e.g., moving forward, backward, left, right, etc., along the ground, while moving in a vertical direction (vertically) is effectively equivalent to moving up (away from the ground) or down (toward or into the ground). Merging the X, Y, Z coordinate access with the terms vertical and horizontal, the Z-axis lies in the vertical direction and the X and Y axes lie in the horizontal plane with the vertical Z axis being orthogonal thereto. To the extent any ambiguity is generated by the specific wording of the above explanations, it is anticipated that such ambiguity may be interpreted and clarified consistent with the conventional interpretations of the terms horizontal and vertical.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:
1. An automated system, comprising:
a storage structure configured to store goods in a plurality of product containers at a plurality of storage locations;
a plurality of robots configured to travel to the plurality of storage locations to retrieve the product containers;
a central control system (CCS) configured to manage automated processes in the automated system; and
a terminal having a network connection to the CCS and configured to present a graphical user interface, the graphical user interface configured to:

present one or more of information and one or more images on goods for purchase,
receive a purchase order of goods using the presented one or more of information and one or more images on goods,
receive one or more home locations where goods in the purchase order are to be stored, and
receive a designation of which goods in the purchase order go to which received home location;
wherein the CCS and one or more of the mobile robots are further configured to transfer goods in the purchase order from product containers to order bags or order containers in accordance with the designated home locations.

2. The automated system of claim 1, wherein the graphical user interface presented by the terminal is configured to present a textual or graphical illustration of home locations.

3. The automated system of claim 2, wherein the graphical user interface presented by the terminal is further configured to illustrate which goods are designated for which home location.

4. The automated system of claim 2, wherein the graphical user interface presented by the terminal is configured to present graphical illustrations of home locations and graphical illustrations of goods in the purchase order positioned within a graphical illustration of the home locations to which the goods are designated.

5. The automated system of claim 2, wherein the graphical user interface presented by the terminal is further configured to:
present a list of goods in the purchase order, and
allow a customer or customer proxy to assign a good in the purchase order to a home location of the home locations by dragging a good in the list to the textual or graphical illustration of the home location.

6. The automated system of claim 2, wherein the graphical user interface presented by the terminal displays a combined weight of goods in the product container or order bag assigned to a home location.

7. The automated system of claim 2, wherein the CCS automatically generates a second product container or order bag when goods assigned to a given home location exceed a predefined weight.

8. The automated system of claim 1, wherein the graphical user interface presented by the terminal is further configured to present a customer or customer proxy with an option to move goods in purchase order from one home location to another home location.

9. The automated system of claim 1, wherein the graphical user interface presented by the terminal is further configured to present a customer or customer proxy the option to add new home locations or delete existing home locations.

10. The automated system of claim 9, wherein the graphical user interface presented by the terminal is further configured to present a customer or customer proxy the option to add or move goods in the purchase order to one or more of the new home locations.

11. The automated system of claim 1, wherein the home locations comprise one of a kitchen, refrigerator, pantry, bathroom, master bath, garage and office.

12. The automated system of claim 1, wherein the CCS is configured with item compatibility rules to assign goods in the purchase order to the home location.

13. The automated system of claim 12, wherein the item compatibility rules are based in part whether a good in the purchase order is a chemical versus food, and attributes of the goods in the purchase order including dimensions and weight of goods in the purchase order.

14. The automated system of claim 1, wherein the CCS is configured to direct the one or more mobile robots to transfer product containers containing the goods in the purchase order from the plurality of storage locations to the picking workstation in sequence based on the home locations of the goods in the purchase order.

15. The automated system of claim 1, wherein the CCS is configured to direct mobile robots of the plurality of mobile robots to bring order totes containing the order bags or order containers from the plurality of storage locations to the picking workstation.

16. The automated system of claim 15, wherein the CCS is configured to direct the one or more mobile robots to transfer order containers from the plurality of storage locations to the picking workstation in sequence based on the home locations of the goods in the purchase order.

17. The automated system of claim 1, wherein the terminal is located within a shopping area within a building including the storage structure.

18. The automated system of claim 1, wherein the terminal is located remotely from a building including the storage structure.

19. An automated system, comprising:
a storage structure configured to store goods in a plurality of product containers at a plurality of storage locations;
a plurality of robots configured to travel to the plurality of storage locations to retrieve the product containers;
a central control system (CCS) configured to manage automated processes in the automated system;
a terminal having a network connection to the CCS and configured to present a graphical user interface, the graphical user interface configured to:
present one or more of information and one or more images on goods for purchase,
receive a purchase order of goods using the presented one or more of information and one or more images on goods, and
receive an assignment of the goods in the purchase order to one or more home locations where the goods are to be placed in the customer's home or office;
a picking workstation where goods are transferred from the product totes to one or more order bags or order containers;
wherein the CCS is further configured to:
direct one or more mobile robots of the plurality of mobile robots to transfer product containers containing the goods in the purchase order from the plurality of storage locations to the picking workstation,
assign each of the order bags or order containers to each of the home locations associated with the purchase order, and
transfer goods in the purchase order from product containers to order bags or order containers in accordance with the assigned home locations.

20. The automated system of claim 19, wherein the graphical user interface presented by the terminal is configured to present a textual or graphical illustration of the one or more home locations, and illustrate which goods are assigned to which of the one or more home locations.

21. The automated system of claim 19, wherein the graphical user interface presented by the terminal is further configured to:
present a list of goods in the purchase order, and
allow a customer or customer proxy to assign a good in the purchase order to a home location of the home locations by dragging a good in the list to the textual or graphical illustration of the home location.

22. The automated system of claim 19, wherein the graphical user interface presented by the terminal is further configured to present a customer or customer proxy the option to add new home locations or delete existing home locations.

23. The automated system of claim 19, wherein the one or more home locations comprise one of a kitchen, refrigerator, pantry, bathroom, master bath, garage and office.

24. The automated system of claim 19, wherein the CCS is configured to direct the one or more mobile robots to transfer product containers containing the goods in the purchase order from the plurality of storage locations to the picking workstation in sequence based on the home locations of the goods in the purchase order.

25. The automated system of claim 19, wherein the CCS is configured to direct one or more mobile robots of the plurality of mobile robots to bring order totes containing the order bags or order containers from the plurality of storage locations to the picking workstation.

26. An automated system, comprising:
    a storage structure configured to store goods in a plurality of product containers at a plurality of storage locations;
    a plurality of robots configured to travel to the plurality of storage locations to retrieve the product containers;
    a central control system (CCS) configured to manage automated processes in the automated system;
    a terminal having a network connection to the CCS and configured to present a graphical user interface, the graphical user interface configured to:
        present one or more of information and one or more images on goods for purchase,
        receive a purchase order of goods using the presented one or more of information and one or more images on goods, and
        receive an assignment of the goods in the purchase order to one or more home locations where the goods are to be placed in the customer's home or office,
        determine a packing order for at least one of the one or more home locations specifying an order in which goods are to be packed in an order bag or order container associated with the at least one home location;
    wherein the CCS and one or more of the mobile robots are further configured to transfer goods in the purchase order from product containers to order bags or order containers in accordance with the one or more home locations and the packing order.

27. The automated system of claim 26, wherein the packing order is determined based on a packing algorithm executed by the CCS.

28. The automated system of claim 26, wherein the packing order is determined based on input received by customer or a customer proxy using the graphical user interface at the terminal.

29. The automated system of claim 26, further comprising a picking workstation where goods are transferred from the product totes to one or more order bags or order containers.

30. The automated system of claim 29, wherein the CCS is configured to direct one or more of the plurality of mobile robots to transfer product containers containing the goods specified in the packing order to the picking station in an order specified in the packing order.

* * * * *